(12) United States Patent
Ristau

(10) Patent No.: US 12,730,568 B2
(45) Date of Patent: Sep. 8, 2026

(54) SMART CABLE FOR CONNECTING STORAGE DRIVES

(71) Applicant: Microchip Technology Incorporated, Chandler, AZ (US)

(72) Inventor: Gerhard Ristau, Coquitlam (CA)

(73) Assignee: Microchip Technology Incorporated, Chandler, AZ (US)

( * ) Notice: Subject to any disclaimer, the term of this patent is extended or adjusted under 35 U.S.C. 154(b) by 30 days.

(21) Appl. No.: 18/933,352

(22) Filed: Oct. 31, 2024

(65) Prior Publication Data

US 2025/0147677 A1 May 8, 2025

Related U.S. Application Data

(60) Provisional application No. 63/547,113, filed on Nov. 2, 2023.

(51) Int. Cl.
*G06F 3/06* (2006.01)

(52) U.S. Cl.
CPC .......... *G06F 3/0625* (2013.01); *G06F 3/0629* (2013.01); *G06F 3/0673* (2013.01)

(58) Field of Classification Search
CPC ..... G06F 3/0625; G06F 3/0629; G06F 3/0673
See application file for complete search history.

(56) References Cited

U.S. PATENT DOCUMENTS 9,164,861 B2 10/2015 Dhandapani et al.
9,304,960 B2 4/2016 Florentino
2008/0028112 A1 1/2008 Kubo et al.
2009/0061678 A1* 3/2009 Minoo .................. H01R 29/00 439/502
2014/0032791 A1* 1/2014 Paul .................... G06F 13/4072 710/17
2015/0326039 A1* 11/2015 Chen ......................... H02J 7/00 323/318
2018/0260349 A1* 9/2018 Mondal ................... G06F 13/16
2020/0328676 A1* 10/2020 Le ......................... H02M 3/073
2024/0393948 A1* 11/2024 Liao ...................... G06F 3/0679

OTHER PUBLICATIONS

International Search Report & Written Opinion issued on Jan. 14, 2025 in corresponding International Application No. PCT/US2024/054079 (12 pages).

* cited by examiner

*Primary Examiner* — Farley Abad

(74) *Attorney, Agent, or Firm* — Shumaker, Loop & Kendrick, LLP; Ryan M. Corbett

(57) ABSTRACT

A smart cable for backplane storage management is provided. The cable may include a microcontroller, a power conditioning circuitry to regulate an input voltage from a power supply and provide an output voltage to the microcontroller, a storage device coupled to the microcontroller, a first end to be coupled to one or more storage devices, and a second end to be coupled to a storage controller. The microcontroller may receive sideband signals from the one or more storage drives, and may transmit connection topology information to the storage controller based at least in part on the sideband signals.

24 Claims, 2 Drawing Sheets

130
Cable 100
120
Micro Controller 140
Storage Device
210A
Power
Conditioning
Circuitry
220

130
Cable 100
120
Micro Controller 140
Power
Conditioning
Circuitry
220
Storage Device
210B

SMART CABLE FOR CONNECTING STORAGE DRIVES

CROSS-REFERENCE TO RELATED APPLICATION

The present application claims priority to U.S. Provisional Patent Application No. 63/547,113, entitled: Smart Cable for Backplane Storage Management, filed on Nov. 2, 2023, the contents of which are hereby incorporated by reference in their entirety.

TECHNICAL FIELD

The present disclosure relates generally to storage backplanes, and more specifically to a smart cable for implementing backplane management functionality.

SUMMARY

According to an aspect of one or more examples, there is provided a cable that may include a microcontroller, a power conditioning circuitry to regulate an input voltage from a power supply and provide an output voltage to the microcontroller, a storage device coupled to the microcontroller, a first end to be coupled to one or more storage drives, and a second end to be coupled to a storage controller. The microcontroller may receive sideband signals from the one or more storage drives, and may transmit connection topology information to the storage controller based at least in part on the sideband signals.

The connection topology information may include at least one of a maximum number of storage drives that may be coupled to the first end, and a number of electrical links supported for the respective storage drives. The maximum number of storage drives that may be coupled to the first end may be eight storage drives. At least one of the maximum number of storage drives that may be coupled to the first end, and the number of electrical links supported for the respective storage drives may be stored in the storage device. The connection topology information may include one or more drive types for the respective one or more storage drives coupled to the first end. The one or more drive types may include a nonvolatile memory express (NVMe) protocol, a serial AT attachment (SATA) protocol, and a serial attached small computer systems interface (SAS) protocol. The number of electrical links supported for the respective storage drives may include information indicating that four electrical links are used per storage drive for storage drives using the NVMe protocol, one electrical link is used per storage drive for storage drives using the SATA protocol, and one or two electrical links are used per storage drive for storage drives using the SAS protocol. The microcontroller may communicate with the storage controller via the Universal Backplane Management protocol. The cable may also include one or more indicators to indicate a connection between the one or more storage drives and the storage controller. The one or more indicators may be light emitting diodes (LEDs). The power conditioning circuitry may provide an output voltage to at least one of the one or more storage drives and the storage controller. The microcontroller may be disposed within a shell of a plug connector of the cable.

According to an aspect of one or more examples, there is provided a method that may include transmitting and receiving sideband signals to and from one or more storage drives that are coupled to a first end of a cable, and transmitting connection topology information to a storage controller that is coupled to a second end of the cable to enable communication between the one or more storage drives and the storage controller. The connection topology information may include at least one of a maximum number of storage drives that may be coupled to the first end, and a number of electrical links supported for the respective storage drives. The maximum number of storage drives that may be coupled to the first end may be eight storage drives. At least one of the maximum number of storage drives that may be coupled to the first end, and the number of electrical links supported for the respective storage drives may be stored in the storage device. The number of electrical links supported for the respective storage drives includes information indicating that four electrical links are used per storage drive for storage drives using the NVMe protocol, one electrical link is used per storage drive for storage drives using the SATA protocol, and one or two electrical links are used per storage drive for storage drives using the SAS protocol. The connection topology information may include one or more drive types for the respective one or more storage drives coupled to the first end. The one or more drive types may include a nonvolatile memory express (NVMe) protocol, a serial AT attachment (SATA) protocol, and a serial attached small computer systems interface (SAS) protocol. The communication between the one or more storage drives and the storage controller may be via a Universal Backplane Management protocol. The method may also include indicating a connection between the one or more storage drives and the storage controller. One or more light emitting diodes (LEDs) may be used to indicate the connection between the one or more storage drives and the storage controller. The method may also include regulating an input voltage from a power supply to generate an output voltage, and providing the output voltage to a microcontroller. The method may also include providing the output voltage to at least one of the one or more storage drives and the storage controller.

DETAILED DESCRIPTION OF VARIOUS EXAMPLES

Figure 1:
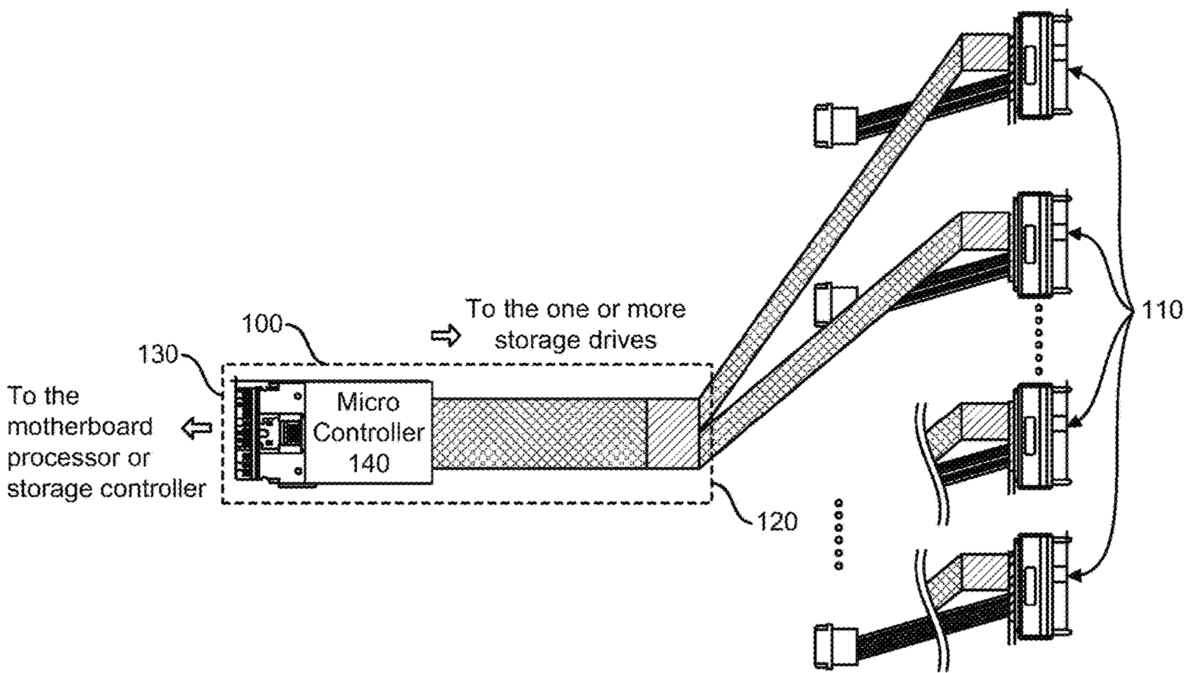
FIG. 1 shows a cable for connecting one or more storage drives according to one or more examples.

Reference will now be made in detail to the following various examples, which are illustrated in the accompanying drawings, wherein like reference numerals refer to like elements throughout. The following examples may be embodied in various forms without being limited to the examples set forth herein.

Backplanes are used to provide multiple electrical connections between various electrical components. For example, backplanes may be implemented on a printed circuit board, and may include various types of connectors, or "slots," to connect various hardware components such as network cards, graphic cards, sound cards, disk controllers, modems, and other peripheral devices. Backplanes may also be used with computer servers to couple multiple removable storage disks. For example, backplanes may be used to couple hard disk drives or solid state drives to a server motherboard or a storage controller. However, backplanes may be preconfigured to accept only certain types of removable drives, and may not be able to be moved to work with other servers once installed. Therefore, there is a need for a more flexible option for coupling removable storage drives to a server motherboard or storage controller that also provides storage management functionality.

FIG. 1 shows a cable 100 for connecting one or more storage drives 110 according to one or more examples. The example cable 100 of FIG. 1 may include a first end 120 that is to be coupled to one or more storage drives 110. For example, the storage drives 110 may be hard disk drives, solid state drives, or other types of storage devices. According to one or more examples, the first end 120 may be able to be coupled to eight storage drives 110, though any number of storage drives 110 may be used. The example cable 100 of FIG. 1 may also include a second end 130 to be coupled to a motherboard processor or a storage controller (not shown in FIG. 1). For example, the motherboard processor or storage controller may be for a computer server that makes use of storage drives 110.

The example cable 100 of FIG. 1 may also include a microcontroller 140, which may be disposed within a shell of a plug connector at the first end 120 or the second end 130 of the cable 100. The microcontroller 140 may communicate with the motherboard processor or storage controller using one or more protocols such as the Universal Backplane Management (UBM) SFF-TA-1005. The microcontroller 140 may transmit connection topology information to the motherboard processor or storage controller so that the motherboard processor or storage controller may transmit and receive information from the one or more storage drives 110 accordingly. For example, the connection topology information may include at least one of the maximum number of storage drive 110 connectors of the cable 100, and the number of electrical links supported for the respective storage drives 110.

The example cable 100 of FIG. 1 may include a storage device (e.g., the storage devices 210A, 210B respectively described in FIGS. 2A and 2B below) that may be coupled to the microcontroller 140. For example, the storage device may be an electronically programmable read only memory (EPROM) that is internal (e.g., the storage device 210A in FIG. 2A) to the microcontroller 140. According to one or more examples, the storage device may be external (e.g., the storage device 210B in FIG. 2B) to the microcontroller 140. The storage device may store the number of storage drive 110 connectors of the cable 100, and the number of electrical links supported for the respective storage drives 110. The information may be hard coded in the storage device during manufacturing, or may be stored in the storage device after manufacturing is completed. For example, for storage drives 110 using the nonvolatile memory express (NVMe) protocol, the storage device may store information indicating that four electric links are used per storage drive 110. Similarly, for storage drives 110 using the serial AT attachment (SATA) protocol, the storage device may store information indicating that one electrical link is used per storage drive 110, or that one or two electrical links are used per storage drive 110 for storage drives 110 using the serial attached small computer systems interface (SAS) protocol. In addition, the storage device may include additional information such as a serial number, model number, and the name of the manufacturer, which may be hard coded during the manufacturing.

According to one or more examples, the motherboard processor or storage controller may be able to accommodate SAS, SATA, and NVMe storage drives 110, but need to be configured accordingly. The microcontroller 140 may transmit and receive sideband signals to and from the one or more storage drives 110 that are coupled to the first end 120 of the cable 100. The sideband signals may be additional communication lines between the microcontroller 140 and the one or more storage drives 110 that handle auxiliary data outside the primary data and control signals. The sideband signals may be used to manage, monitor, and control the one or more storage drives 110, providing functionality that does not involve direct transfer operations. The sideband signals between the microcontroller 140 and the one or more storage drives 110 may include power control signals (e.g., power enable, power good), reset signals, error and status indicators (e.g., activity LED or fault signals), temperature monitoring signals, clock and synchronization signals, and vendor-specific control signals. Primary signals may handle the actual data transfer and main control commands, while the sideband signals may be auxiliary, providing supporting functions like power management, status reporting, and environmental monitoring. Primary signals may follow standard protocols (e.g., SATA, NVMe, or PCIe) for high-speed data transfer. The sideband signals may use simpler signaling protocols (e.g., GPIO or $I^2C$) since they handle less time-critical and lower bandwidth tasks. The sideband signals may maintain the one or more storage drive's 110 operational integrity, efficiency, and health by managing power, reset, and status operations in the background. The sideband signals may contain connection topology information, such as information indicating the type (e.g., SAS, SATA, NVMe, etc.) of storage drives 110 that are coupled to the first end 120 of the cable 100. As discussed above, the microcontroller 140 may transmit the connection topology information to the motherboard processor or storage controller to enable communication between the one or more storage drives 110 and the server motherboard or storage controller.

According to one or more examples, the cable 100 may include power conditioning circuitry (e.g., the power conditioning circuitry 220 in FIGS. 2A and 2B), such as a voltage regulator. The power conditioning circuitry may receive an input voltage from a power supply, and may regulate the input voltage to provide an output voltage at an appropriate voltage level for use by the microcontroller 140. According to one or more examples, the cable 100 may also include one or more indicators, such as light emitting diodes (LEDs), to indicate a connection between the one or more storage drives 110 and the motherboard processor or storage controller. The cable 100 may also provide power to the one or more storage drives 110, and the motherboard processor or storage controller, and may also include electrical links to transmit data between the one or more storage drives 110 and the motherboard processor or storage controller.

According to one or more examples, by incorporating a microcontroller 140 into the cable 100, as opposed to a backplane, the cable 100 can provide backplane management functionality for various types of servers. For example, the cable 100 according to one or more examples may work with platforms having different physical parameters. Moreover, the cable 100 according to one or more examples may achieve a cost savings as compared to cables that connect storage drives 110 to storage controllers or motherboard processors, but rely on separate controller chips to perform backplane management.

Figures 2A, 2B:
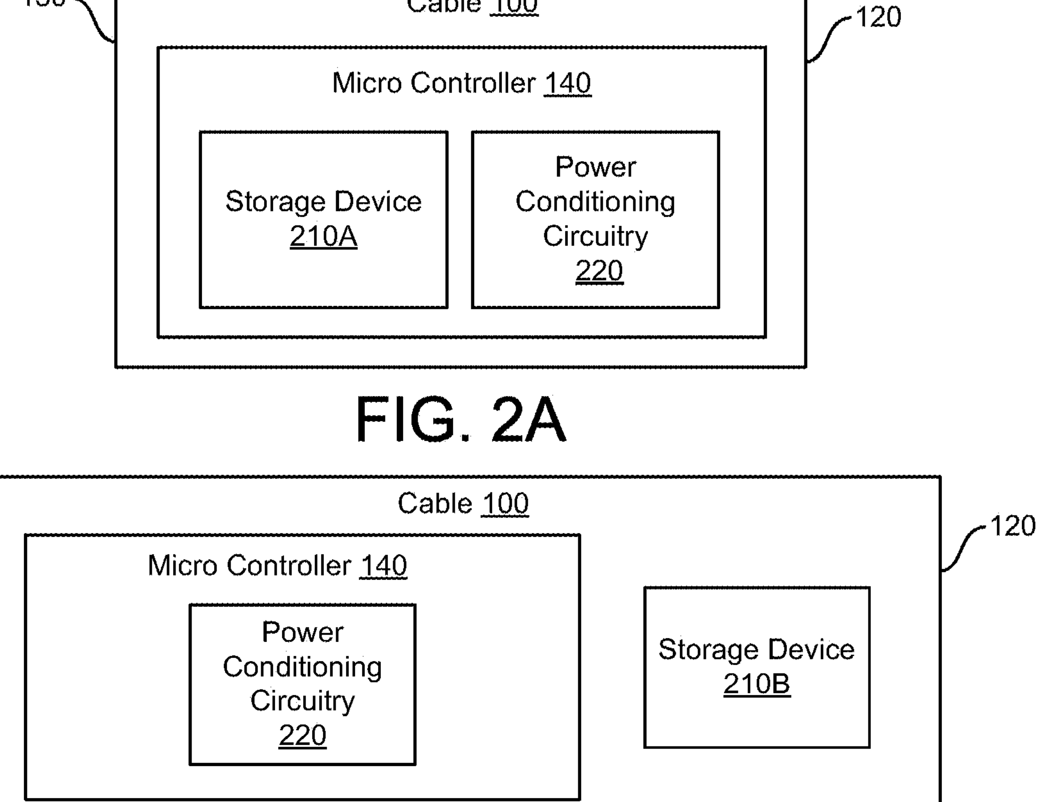
FIGS. 2A and 2B show a cable for connecting one or more storage drives according to one or more examples.

FIGS. 2A and 2B show a cable 100 for connecting one or more storage drives according to one or more examples. As discussed above, the cable 100 may include the microcontroller 140. As shown in FIG. 2A, the storage device 210A, such as an electronically programmable read only memory (EPROM), may be internal to the microcontroller 140. As shown in FIG. 2B, the storage device 210B may be external to the microcontroller 140. The cable 100 may include power conditioning circuitry 220, such as a voltage regulator. The power conditioning circuitry 220 may receive an input voltage from a power supply, and may regulate the input voltage to provide an output voltage at an appropriate level for use by the microcontroller 140.

Various examples have been disclosed herein, in connection with the above description and the drawings. It will be understood that it would be unduly repetitious to literally describe and illustrate every combination and subcombination of these examples. Accordingly, all examples can be combined in any way or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A cable comprising:

a microcontroller;

a power conditioning circuitry to regulate an input voltage from a power supply and provide an output voltage to the microcontroller;

a storage device coupled to the microcontroller;

a first end to be coupled to one or more storage drives; and a second end to be coupled to a storage controller;

wherein the microcontroller is to receive sideband signals from the one or more storage drives and to transmit connection topology information to the storage controller based at least in part on the sideband signals, and wherein the connection topology information includes at least one of a maximum number of storage drives that may be coupled to the first end and a number of electrical links supported for the respective storage drives, with the at least one of the maximum number of storage drives and the number of electrical links stored in the storage device.

2. The cable of claim 1, wherein the maximum number of storage drives that may be coupled to the first end is eight storage drives.

3. The cable of claim 1, wherein the connection topology information includes one or more drive types for the respective one or more storage drives coupled to the first end.

4. The cable of claim 3, wherein the one or more drive types include a nonvolatile memory express (NVMe) protocol, a serial AT attachment (SATA) protocol, and a serial attached small computer systems interface (SAS) protocol.

5. The cable of claim 4, wherein the number of electrical links supported for the respective storage drives includes information indicating that four electrical links are used per storage drive for storage drives using the NVMe protocol, one electrical link is used per storage drive for storage drives using the SATA protocol, and one or two electrical links are used per storage drive for storage drives using the SAS protocol.

6. The cable of claim 1, wherein the microcontroller is to communicate with the storage controller via a Universal Backplane Management protocol.

7. The cable of claim 1, further comprising one or more indicators to indicate a connection between the one or more storage drives and the storage controller.

8. The cable of claim 7, wherein the one or more indicators are light emitting diodes (LEDs).

9. The cable of claim 1, wherein the power conditioning circuitry provides an output voltage to at least one of the one or more storage drives and the storage controller.

10. The cable of claim 1, wherein the microcontroller is disposed within a shell of a plug connector of the cable.

11. The cable of claim 1, wherein the sideband signals comprise at least one of power control signals, reset signals, error and status indicators, temperature monitoring signals, clock and synchronization signals, and vendor-specific control signals.

12. The cable of claim 1, wherein the storage device is an electronically programmable read only memory (EPROM).

13. A method comprising:

transmitting and receiving sideband signals to and from one or more storage drives that are coupled to a first end of a cable; and transmitting connection topology information to a storage controller that is coupled to a second end of the cable to enable communication between the one or more storage drives and the storage controller, wherein the connection topology information includes at least one of a maximum number of storage drives that may be coupled to the first end and a number of electrical links supported for the respective storage drives, with the at least one of the maximum number of storage drives and the number of electrical links stored in a storage device.

14. The method of claim 1, wherein the maximum number of storage drives that may be coupled to the first end is eight storage drives.

15. The method of claim 1, wherein the number of electrical links supported for the respective storage drives includes information indicating that four electrical links are used per storage drive for storage drives using a NVMe protocol, one electrical link is used per storage drive for storage drives using a SATA protocol, and one or two electrical links are used per storage drive for storage drives using a SAS protocol.

16. The method of claim 13, wherein the connection topology information includes one or more drive types for the respective one or more storage drives coupled to the first end.

17. The method of claim 16, wherein the one or more drive types include a nonvolatile memory express (NVMe) protocol, a serial AT attachment (SATA) protocol, and a serial attached small computer systems interface (SAS) protocol.

18. The method of claim 13, wherein the communication between the one or more storage drives and the storage controller is via a Universal Backplane Management protocol.

19. The method of claim 13, further comprising indicating a connection between the one or more storage drives and the storage controller.

20. The method of claim 19, wherein one or more light emitting diodes (LEDs) are used to indicate the connection between the one or more storage drives and the storage controller.

21. The method of claim 13, further comprising:

regulating an input voltage from a power supply to generate an output voltage;

providing the output voltage to a microcontroller.

22. The method of claim 21, further comprising:

providing the output voltage to at least one of the one or more storage drives and the storage controller.

23. The method of claim 13, wherein the sideband signals comprise at least one of power control signals, reset signals, error and status indicators, temperature monitoring signals, clock and synchronization signals, and vendor-specific control signals.

24. The method of claim 13, wherein the storage device is an electronically programmable read only memory (EPROM).

* * * * *